United States Patent
Hegarty et al.

(10) Patent No.: US 12,395,834 B2
(45) Date of Patent: Aug. 19, 2025

(54) INTERNET PROTOCOL MULTIMEDIA SUBSYSTEM NODE, SERVER NODE AND METHODS IN A COMMUNICATIONS NETWORK

(71) Applicant: Telefonaktiebolaget LM Ericsson (PUBL), Stockholm (SE)

(72) Inventors: Charles Hegarty, Stockholm (SE); Andreas Anulf, Lidingö (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 309 days.

(21) Appl. No.: 17/790,224

(22) PCT Filed: Feb. 11, 2020

(86) PCT No.: PCT/SE2020/050138
§ 371 (c)(1),
(2) Date: Jun. 30, 2022

(87) PCT Pub. No.: WO2021/162593
PCT Pub. Date: Aug. 19, 2021

(65) Prior Publication Data
US 2023/0085215 A1 Mar. 16, 2023

(51) Int. Cl.
*H04W 12/03* (2021.01)
*H04L 65/1016* (2022.01)
(Continued)

(52) U.S. Cl.
CPC ......... *H04W 12/03* (2021.01); *H04L 65/1016* (2013.01); *H04L 65/1069* (2013.01); *H04W 76/18* (2018.02)

(58) Field of Classification Search
CPC .. H04W 12/03; H04W 76/18; H04L 65/1016; H04L 65/1069; H04L 65/1063; H04L 65/1076
See application file for complete search history.

(56) References Cited

U.S. PATENT DOCUMENTS

2011/0286394 A1* 11/2011 Prasad ................ H04L 65/1104
370/328
2012/0002816 A1* 1/2012 Tian ........................ H04L 9/321
380/270

FOREIGN PATENT DOCUMENTS

WO    WO-2011050235 A1 *  4/2011    ............. G06F 21/33

OTHER PUBLICATIONS

A Privacy Mechanism for the Session Initiation Protocol (SIP), RFC 3323, by J. Peterson (Year: 2002).*
(Continued)

*Primary Examiner* — Pamit Kaur
(74) *Attorney, Agent, or Firm* — Baker Botts L.L.P.

(57) ABSTRACT

A method performed by an Internet Protocol Multimedia Subsystem, IMS, node, for handling a setup of a session between a first User Equipment, UE, and a second UE, in a communications network is provided. The IMS node receives (301) a request to setup a session from the first UE to the second UE. The request indicates a privacy value which the first UE has requested to apply for the session. The IMS node sends (302) a request to a server node. The request comprises an identity of the first UE and the privacy value. The request requests the server node to analyse the reputation of the first UE based on the identity of the first UE and the privacy value. The IMS node receives (303) a response from the server node. The response indicates the analysed reputation of the first UE. The IMS node then decides (304) how to handle the session setup and session privacy, based on the analysed reputation of the first UE.

22 Claims, 11 Drawing Sheets

(51) Int. Cl.
*H04L 65/1069* (2022.01)
*H04W 76/18* (2018.01)

(56) References Cited

OTHER PUBLICATIONS

3GPP TR 33.937 v15.0.0; Technical Report; 3rd Generation Partnership Project; Technical Specification Group Services and System Aspects; Study of Mechanisms for Protection against Unsolicited Communication for IMS (PUCI) (Release 15)—Jun. 2018.
J. Peterson, A Privacy Mechanism for the Session Initiation Protocol (SIP), Network Working Group, Request for Comments: 3323—Nov. 2002.
PCT International Search Report issued for International application No. PCT/SE2020/050138—Oct. 21, 2020.
Series X: Data Networks, Open System Communications and Security,Telecommunication security, Overall aspects of countering spam in IP-basedd multimedia applications, ITU-T, Telecommunication Standardization Sector of ITU (X.1244)—Sep. 2008.
PCT Written Opinion of the International Searching Authority issued for International application No. PCT/SE2020/050138—Oct. 21, 2020.

\* cited by examiner

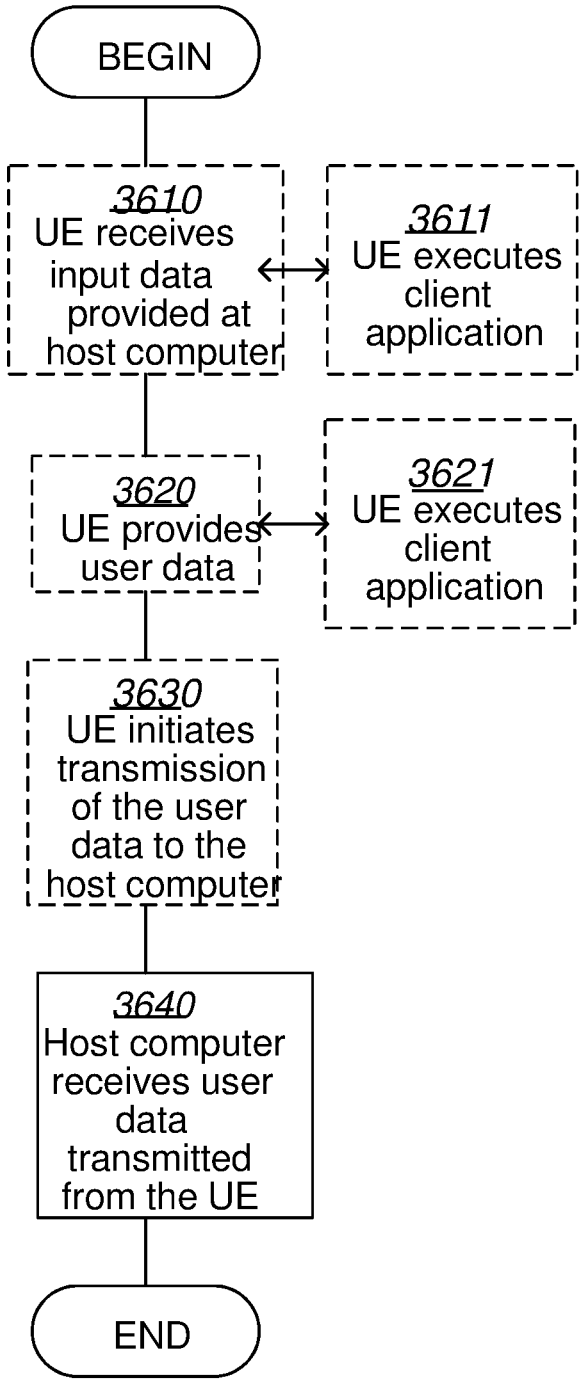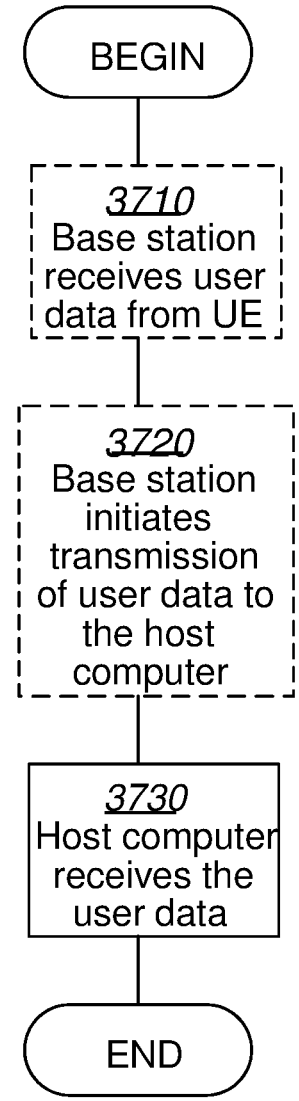
FIG. 11
FIG. 12

INTERNET PROTOCOL MULTIMEDIA SUBSYSTEM NODE, SERVER NODE AND METHODS IN A COMMUNICATIONS NETWORK

PRIORITY

This nonprovisional application is a U.S. National Stage Filing under 35 U.S.C. § 371 of International Patent Application Serial No. PCT/SE2020/050138 filed Feb. 11, 2020 and entitled "Internet Protocol Multimedia Subsystem Node, Server Node and Methods in a Communications Network" which is hereby incorporated by reference in its entirety.

TECHNICAL FIELD

Embodiments herein relate to an Internet Protocol Multimedia Subsystem (IMS) node, a server node and methods therein. In some aspects, embodiments relate to handling a setup of a session between a first user equipment (UE) and a second UE in a communications network.

BACKGROUND

In a typical communications network, wireless devices, also known as wireless communication devices, mobile stations, stations (STA) and/or User Equipments (UE), communicate via a Local Area Network such as a Wi-Fi network or a Radio Access Network (RAN) to one or more core networks (CN). The RAN covers a geographical area which is divided into service areas or cell areas, which may also be referred to as a beam or a beam group, with each service area or cell area being served by a radio network node such as a radio access node e.g., a Wi-Fi access point or a radio base station (RBS), which in some networks may also be denoted, for example, a NodeB, eNodeB (eNB), or gNB as denoted in Fifth Generation (5G) telecommunications. A service area or cell area is a geographical area where radio coverage is provided by the radio network node. The radio network node communicates over an air interface operating on radio frequencies with the wireless device within range of the radio network node.

Specifications for the Evolved Packet System (EPS), also called a Fourth Generation (4G) network, have been completed within the 3rd Generation Partnership Project (3GPP) and this work continues in the coming 3GPP releases, for example to specify a 5G network also referred to as 5G New Radio (NR). The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs used in 3G networks. In general, in E-UTRAN/LTE the functions of a 3G RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

Multi-antenna techniques may significantly increase the data rates and reliability of a wireless communication system. The performance is in particular improved if both the transmitter and the receiver are equipped with multiple antennas, which results in a Multiple-Input Multiple-Output (MIMO) communication channel. Such systems and/or related techniques are commonly referred to as MIMO.

Internet Protocol Multimedia Subsystem (IMS) is an architectural framework for delivering Internet Protocol (IP) services, e.g. Voice over LTE (VoLTE) and Wifi Calling.

Requests are being received from global IMS operators to provide a calling reputation service. A pre-requisite from these operators is that the calling reputation service is implemented on their Telephony Application Server (TAS) or Multimedia Telephony Service Application Server (MM-Tel AS) and offered to their VoLTE subscribers. The TAS is an entity that provides a number of services for the operator and end users. These services include for example an enriched real time communication experience based on several media components such as voice, video, text chat, sharing of different file attachments and presence information. The call session is treated in the calling reputation service, based on information requested and received from an external reputation function which is accessed via RESTful APIs from the TAS. A RESTful API when used herein is a Web service application program interface (API) that adheres to the Representational State Transfer (REST) architectural principles.

One implementation of this calling reputation service is a network based anti-spam service such as an anti-Robocalling service. Based on information provided by an external reputation function it can be determined if a calling entity, such as a subscriber, is a suspected spam. Regulators are pushing operators in Europe to deliver this function in 2020.

Operators are requesting that the RESTful APIs used towards these external reputation functions are based on Open Mobile Alliance (OMA) One Application Programming Interface (API), Call control profile as outlined in Open Mobile Alliance, OMA-TS-REST_NetAPI_One-APIProfile-V4_0-20130305-C and in particular the sub-API call_notification outlined in Open Mobile Alliance OMA-TS-REST_NetAPI_CallNotification-V1_0-20120327-C.

A Session Initiation Protocol (SIP) provides privacy mechanisms as outlined in Request for Comments (RFC) 3323 A Privacy Mechanism for the Session Initiation Protocol (SIP). It outlines & mandates how a UE can request particular functions from a defined privacy service. The UE may request such privacy services from the network with a SIP header "Privacy", that may be used to specify privacy handling for requests and responses. The service values that may be requested, and carried in the privacy header, may for example be: Header, Session, User, None, Critical and ID. It should be noted that any other service value may be used. This will be explained in more detail below.

An example of it's use is commonly seen in scenarios in which a party desiring anonymity may send a message and withhold an identity from the final destination.

On receiving an incoming session request the TAS will invoke an external reputation function and/or application using the OMA defined RESTful API: call_notification using notification-type: call_direction, or a similar API.

TAS issues a "POST/notifications/CallDirection" Message, where POST may be a HyperText Transfer Protocol (HTTP) method request used by the API, or similar method to inform the reputation function that a certain event has occurred, e.g. incoming session request received, and for whom, i.e. the calling participant and the called participant refered to as <calling Participant> & <calledParticipant>.

TAS will await instructions on how to handle the call, e.g. based on information received TAS may reject the call as spam if that is suspected etc. Unfortunately, this may lead to a serious security breach such as distribution of anonymized identities to other entities, failed calls etc.

SUMMARY

As a part of developing embodiments herein a problem was identified by the inventors and will first be discussed.

As currently defined, an OMA RESTful API operation which may be used for the calling reputation services does not contain any data element to relay privacy information to the reputation function and/or application that has been requested by the UE from the network. For example, if the user of a UE has set privacy header to "none" it indicates that a privacy service in the network shall not apply any privacy functions to this message. As stated in RFC 3323, intermediaries in the SIP protocol, e.g. the reputation function and/or application, must not remove or alter a privacy header whose privacy value is 'none'. If privacy level of "user" is requested this could entail the modification of e.g. a "From"-header, changing the value in the "From"-header from its original value to an anonymous value.

The reputation function has no method of obtaining this information currently and thus cannot act correctly. As mentioned above, not adhering to the privacy directives may result in a serious security breach. It may e.g. distribute anonymized identity to other entities and/or implement behavior contrary to the wishes of the UE and may also result in failed calls.

An object of embodiments herein is to improve the performance of a communications network handling privacy when setting up a session setup for a UE in an IMS network.

According to an aspect of embodiments herein, the object is achieved by a method performed by an IMS node, for handling a setup of a session between a first UE and a second UE in a communications network. The IMS node receives a request to set up a session from the first UE to the second UE. The request indicates a privacy value which the first UE has requested to apply for the session. The IMS node sends a request to a server node. The request comprises an identity of the first UE and the privacy value. The request requests the server node to analyse a reputation of the first UE based on the identity of the first UE and the privacy value. The IMS node receives a response from the server node. The response indicates the analysed reputation of the first UE. The IMS node then decides how to handle the session setup and session privacy, based on the analysed reputation of the first UE.

According to another aspect of embodiments herein, the object is achieved by a method performed by a server node, for handling a setup of a session between a first UE and a second UE in a communications network. The server node receivies a request from an IMS node. The request comprises an identity of the first UE and a privacy value requested by the first UE. The request requests the server node to analyse a reputation of the first UE based on the identity of the first UE and the privacy value. The server node analyses the reputation of the first UE based on the identity of the first UE and the privacy value. The server node then sends a response to the IMS node. The response indicates to the IMS node the analysed reputation of the first UE.

According to another aspect of embodiments herein, the object is achieved by an IMS node. The IMS node is configured to handle a setup of a session between a first UE and a second UE in a communications network. The IMS node is further configured to receive a request to set up a session from the first UE to the second UE. The request is adapted to indicate a privacy value which the first UE has requested to apply for the session. The IMS node is further configured to send a request to a server node. The request is adapted to comprise an identity of the first UE and the privacy value. The request is adapted to request the server node to analyse a reputation of the first UE based on the identity of the first UE and the privacy value. The IMS node is further configured to receive a response from the server node. The response is adapted to indicate the analysed reputation of the first UE. The IMS node is yet further configured to decide how to handle the session setup and session privacy, based on the analysed reputation of the first UE.

According to another aspect of embodiments herein, the object is achieved by a server node. The server node is configured to handle a setup of a session between a first UE and a second UE in a communications network. The server node is further configured to receive a request from an IMS node. The request is adapted to comprise an identity of the first UE and a privacy value requested by the first UE. The request is adapted to request the server node to analyse a reputation of the first UE based on the identity of the first UE and the privacy value. The server node is further configured to analyse the reputation of the first UE based on the identity of the first UE and the privacy value. The server node is further configured to send a response to the IMS node. The response is adapted to indicate to the IMS node, the analysed reputation of the first UE.

Embodiments herein bring the advandtage of improving the privacy handling of the UE in the IMS network. Since the privacy value requested for the session by the UE is taken into consideration when analysing the reputation of the first UE, a more accurate result of the analysis will be achieved which, in turn, will decrease the risk of security breaches. This results in an improved performance of the communications network handling privacy when setting up the session setup for the UE in the IMS network.

BRIEF DESCRIPTION OF THE DRAWINGS

Examples of embodiments herein are described in more detail with reference to attached drawings in which:

FIGS. 9-12 are flowcharts illustrating methods implemented in a communication system including a host computer, a base station and a user equipment.

DETAILED DESCRIPTION

Figure 1A:
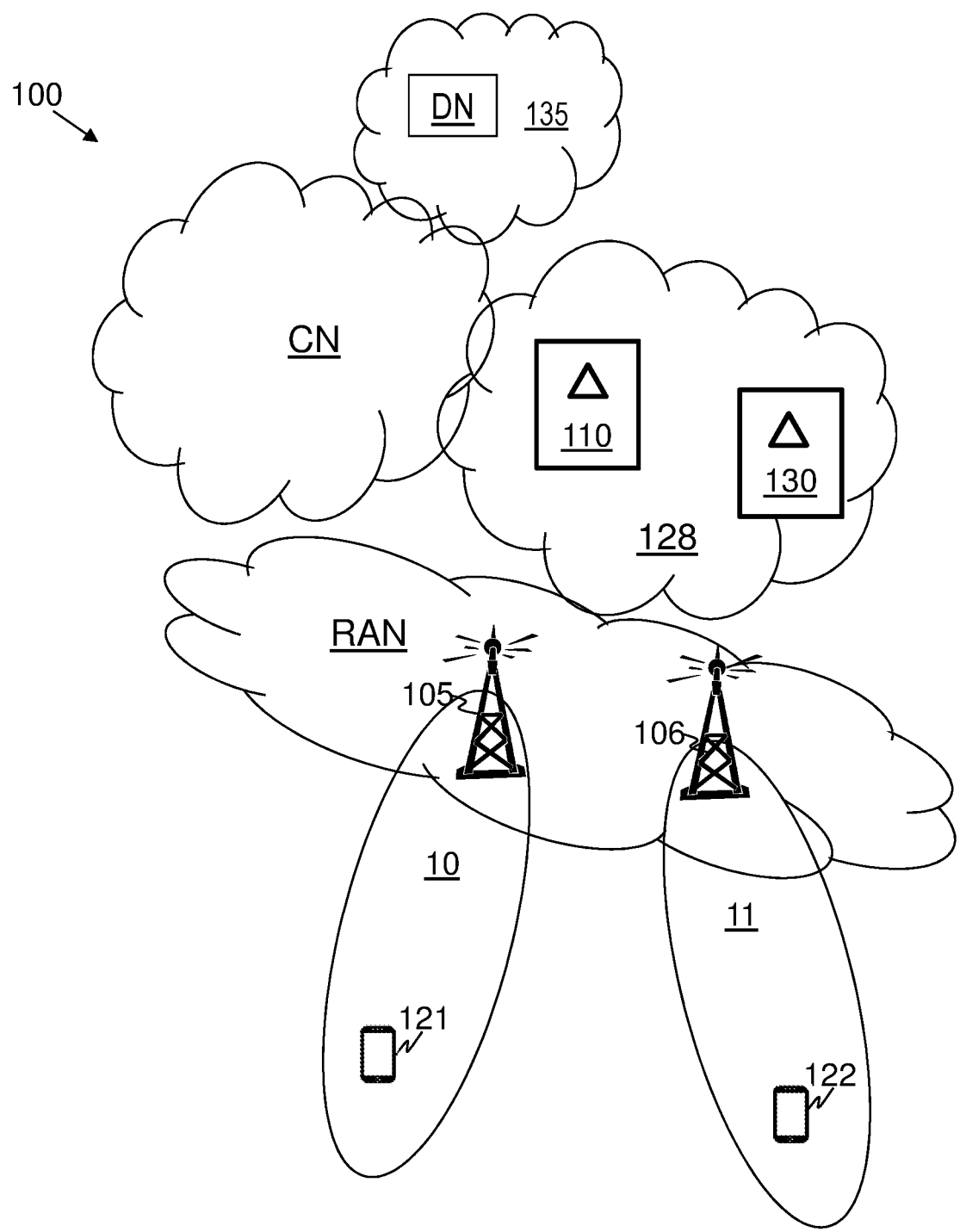
FIG. 1a is a schematic block diagram illustrating embodiments of a communications network.

Embodiments herein relates to an IMS network and the handling of privacy when setting up a session in the IMS network, such as e.g an anti-spam privacy framework in the IMS network.

Embodiments herein provide one or more additional elements, also referred to as considerations, that may be used by call direction event clients in a server node, e.g. a reputation function and/or application, to enable the server node to make a more accurate analysis of the reputation of the UE. This analysis is sent to an IMS node serving the UE, and will make a reliable basis for the IMS node to determine on how to handle the setup of a session in accordance with the privacy service requested by the UE, such as e.g. a VoLTE service.

The additional element may be passed as a new information element (IE) in an operation, e.g. in a CallEventNotification operation for the purposes of Call Direction or Call Notification handling.

An example of the new element may be as follows:
Privacy
  xsd:string
  values: "header"/"session"/"user"/"none"/"critical"/"ID"

Example of service values that may be requested by the UE, may comprise the following:

The service value Header indicates that the UE has requested that a privacy service, e.g. as implemented by the server node, obscure those headers which cannot be completely expunged of identifying information without the assistance of intermediaries. No unnecessary headers should be added by the service that may reveal personal information about the originator of the request.

The service value Session means that the UE requests that a privacy service, e.g. as implemented by the server node, provide anonymization for this session.

The service value User may be set only by intermediaries, in order to communicate that user level privacy function must be provided by the network.

The service value None means that the UE requests that a privacy service, e.g. as implemented by the server node, applies no privacy functions to this message.

The service value Critical means that the UE asserts that the privacy services, e.g. as implemented by the server node, requested for this message are critical, and that therefore, if these privacy services cannot be provided by the network, this request should be rejected.

The service level ID indicates that the UE would like a Network Asserted Identity, such as e.g. P-Asserted-Identity (PAI) and P-Prefered-ID (PPI), to be kept private with respect to SIP entities outside a trusted domain with which the UE is authenticated.

The above values may be set by the IMS node based on parameter values received in, and retrieved from, the request to setup the session. The relevant value is included in the "Privacy" element and sent in e.g. POST/notifications/Call-Direction towards the call direction client, e.g. the server node.

The embodiments herein may provide adherence to 3GPP TS 24.229 v15.9.0 and RFC 3323 and standard network privacy handling by OneAPI compliant call direction clients and network nodes are assured that 3rd party clients act according to 3GPP TS 24.229 v15.9.0 and RFC 3323.

Further, call direction clients, e.g. a reputation function and/or application, an anti-spam service or a anti-robocalling service can improve their machine learning algorithms based on privacy element in the API. Even further, it will provide enhanced functionality possibilities for call direction clients, e.g. implement privacy service functionality based on the newly introduced API element.

Embodiments herein relate to communications networks in general. FIG. 1a is a schematic overview depicting a communications network 100. The communications network 100 comprises one or more RANs and one or more CNs. The wireless communications network 100 may use a number of different technologies, such as Wi-Fi, Long Term Evolution (LTE), LTE-Advanced, 5G, New Radio (NR), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

A number of network nodes such as base stations operate in the communications network 100 such as e.g. a base station 105, and a base station 106. These network nodes provide radio coverage in a number of cells, such as a cell 10 provided by the base station 105, a cell 11 provided by the base station 106.

The base station 105 and the base station 106 may each be any of a NG-RAN node, a transmission and reception point e.g. a base station, a radio access network node such as a Wireless Local Area Network (WLAN) access point or an Access Point Station (AP STA), an access controller, a base station, e.g. a radio base station such as a NodeB, an evolved Node B (eNB, eNode B), a gNB, a base transceiver station, a radio remote unit, an Access Point Base Station, a base station router, a transmission arrangement of a radio base station, a stand-alone access point or any other network unit capable of communicating with a wireless device within the service area served by the base station 105 depending e.g. on the first radio access technology and terminology used. The base station 105 communicates with a first UE 121 with Downlink (DL) transmissions to the first UE 121 and Uplink (UL) transmissions from the first UE 121. In the same manner as for the base station 105, the base station 106 communicates with a second UE 122.

In the communications network 100, one or more UEs operate, such as e.g. the first UE 121 and the second UE 122. Either of the UEs 121 and 122 may also be referred to as a device, an internet of things (IoT) operable device, a mobile station, a non-access point (non-AP) STA, a STA, a user equipment and/or a wireless terminals, communicate via one or more Access Networks (AN), e.g. RAN, to one or more core networks (CN). It should be understood by the skilled in the art that "UE" is a non-limiting term which means any terminal, wireless communication terminal, wireless device, Machine Type Communication (MTC) device, Device to Device (D2D) terminal, or node e.g. smart phone, laptop, mobile phone, sensor, relay, mobile tablets or even a small base station communicating within a cell.

The communications network 100 further comprises an IMS network 128, in which IMS network 128, an IMS node 110 and a server node 130 operate. The IMS network is an architecture for delivering media content over a Internet Protocol packet switched transport. The IMS node 110 is used for setting up and controlling calls and other sessions and may e.g. be an application server such as a TAS or MMTel AS. The server node 130 is used for analysing the reputation of a calling or called participant in a communication session. The server node 130 may e.g. be a calling reputation function and/or application, an anti spam service or an anti robocalling service. The reputation may, but is not limited to, e.g. indicate whether or not it is likely that the analysed UE is a spam caller, an automated caller, a regular caller or a fraudulent caller. E.g. a value indicating the reputation according to an indexed list or similar.

Methods herein may be performed by the IMS node 110 and the server node 130. As an alternative, a Distributed Node (DN) and functionality, e.g. comprised in a cloud 135 as shown in FIG. 1*a*, may be used for performing or partly performing the methods herein.

The above described problem is addressed in a number of embodiments, some of which may be seen as alternatives, while some may be used in combination.

Figure 1B:
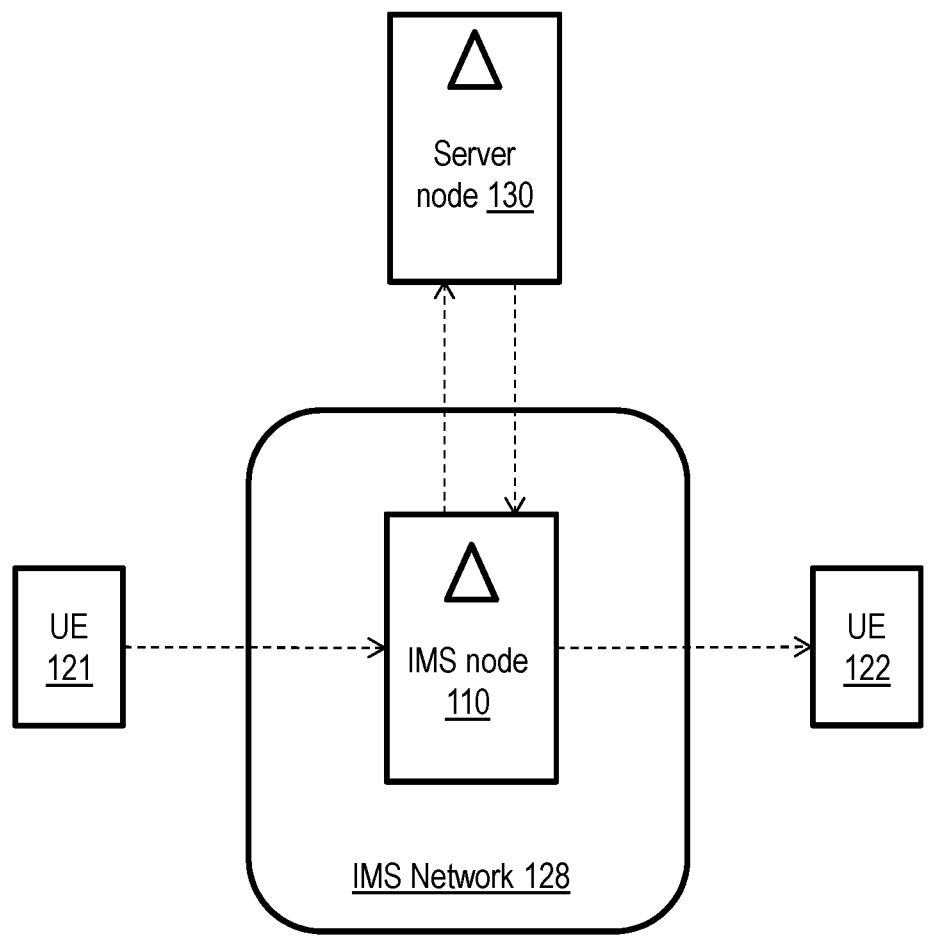
FIG. 1b is a schematic block diagram illustrating embodiments of an IMS network.

FIG. 1*b* shows a schematic overview of embodiments of the IMS network 128 wherein embodiments herein may be implemented. The IMS network 128 comprises one or more IMS nodes, such the IMS node 110 and may comprise the server node 130 described above. The IMS node 110 may communicate with the first UE 121 and the second UE 122, through other nodes not shown here, and with the server node 130.

Figure 2:
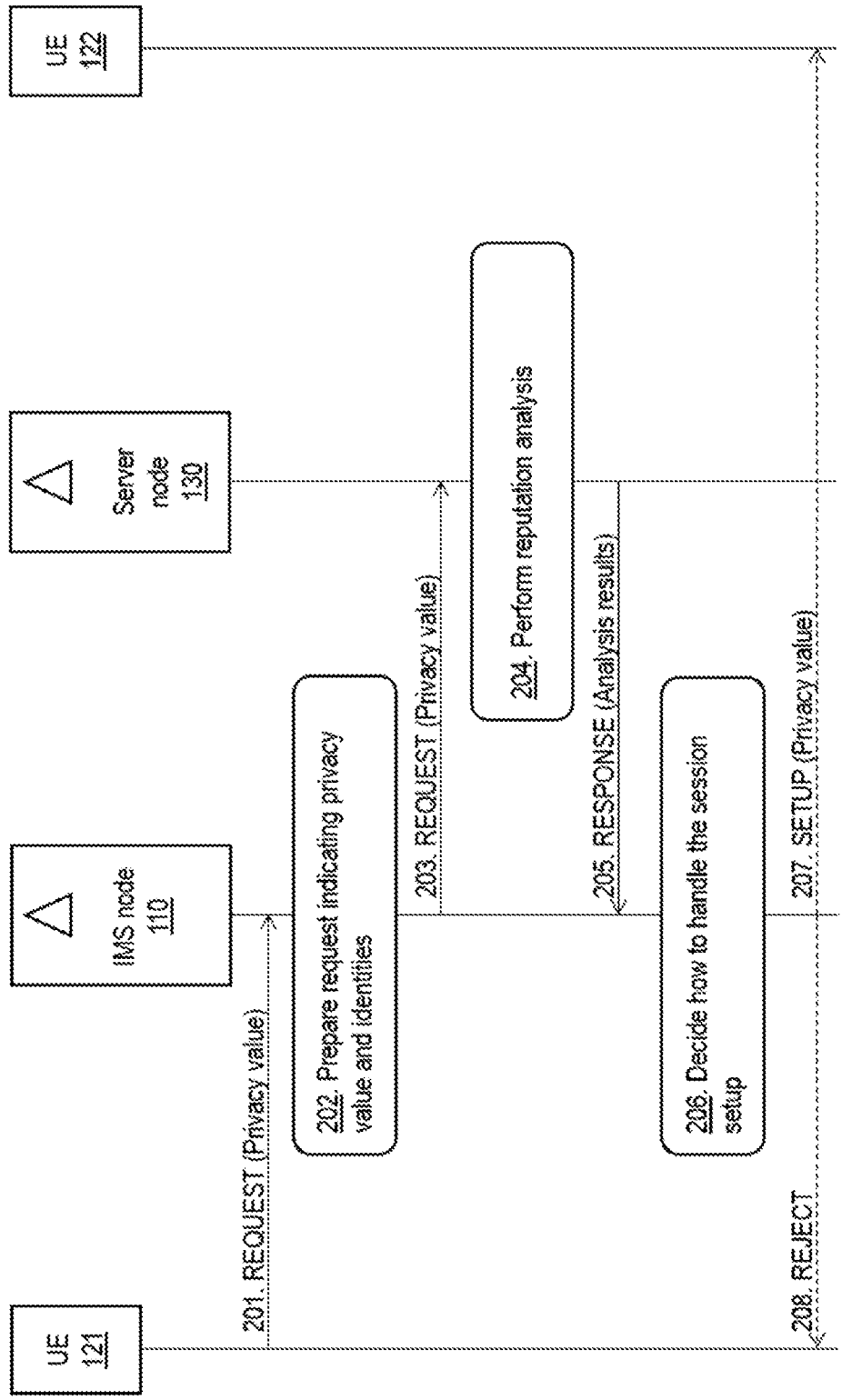
FIG. 2 is a combined sequence diagram and flow chart depicting embodiments of a method.

FIG. 2 shows a schematic signalling scheme of an example scenario of embodiments herein. The first UE 121 communicates with the IMS node 110 e.g. when it wants to setup a communication session with the second UE 122. Before the communication session is setup, the IMS node 110 communicates with the server node 130 e.g. in order to determine a reputation of the first UE 121, after which the IMS node 110 may or may not setup the communication session with the second UE 122.

Action 201. The first UE 121 that wants to set up the communication session with the second UE 122 sends the request to the IMS node 110. The request comprises the privacy value the first UE 121 wants for the session. The request may be a SIP Invite message. This action relates to action 301 described below.

Action 202. The IMS node 110 receives the request and may note the privacy value comprised in the request. The IMS node 110, e.g. a TAS, prepares the request such as a CallEventNotification: callDirection operation. The IMS node 110 notes the privacy header value and includes it in a new API element in the request. The IMS node 110 also include the identity of the first UE 121 in the request, and may further include the identity of the second UE 122.

Action 203. When the IMS node 110 has prepared the request, the IMS node 110 sends the request to the server node 130. The request requests the server node 130 to analyse the reputation of the first UE 121. This action relates to actions 302 and 401 described below.

Action 204. The server node 130 performs the analysis of the reputation of the first UE 121 using the data comprised in the received request, i.e. the identity of the first UE 121, the privacy value, and, if comprised in the request, the identity of the second UE 122 may be used also. The outcome of the analysis may also result in a recommendation on how to handle the session setup. This action relates actions 402 described below.

Action 205. When the analysis of the reputation of the first UE 121 has been completed, the server node 130 sends the response, comprising the result of the analysis, which is received by the IMS node 110. This action relates to actions 303 and 403 described below.

Action 206. The IMS node 110, after receiving the response, decides how to handle session setup between the first UE 121 and the second UE 122 based on the received result of the analysis. This action relates to action 304 described below.

Actions 207-208. The IMS node 110 may then decide to setup the session, but may alterantively decide to reject the session. These actions relates to action 305 and 306 described below.

Figure 3:
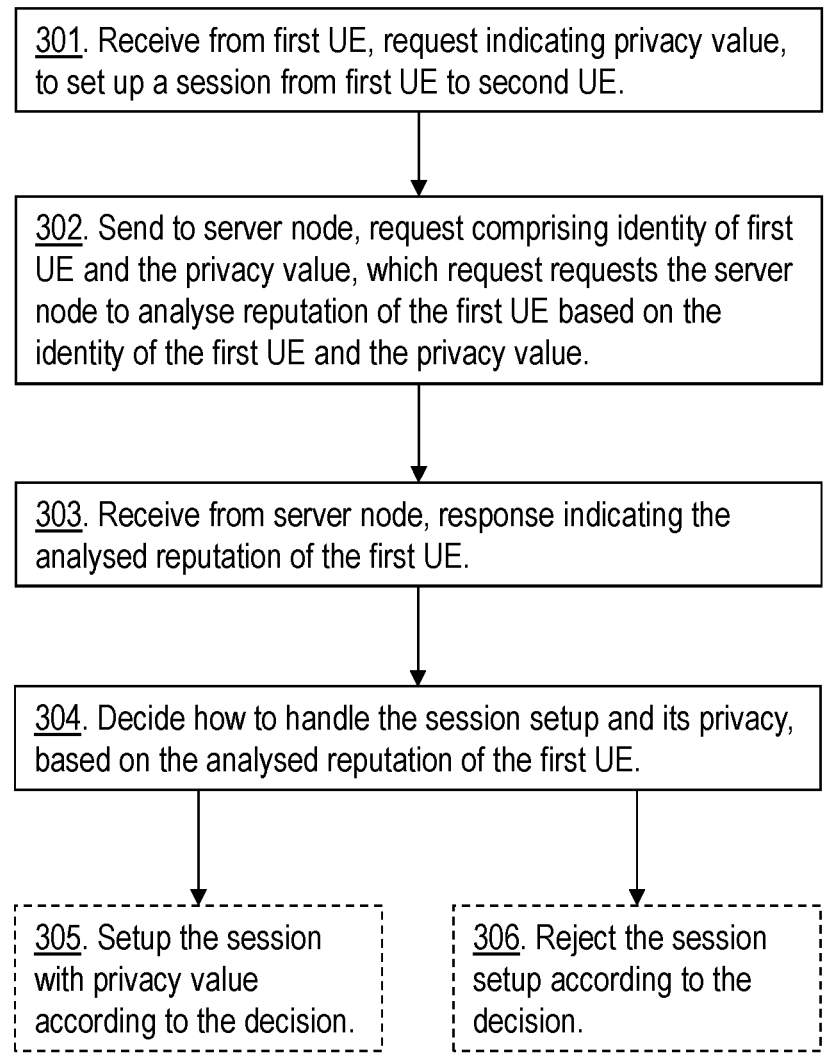
FIG. 3 is a flow chart depicting embodiments of a method in an IMS node.

FIG. 3 shows example embodiments of a method performed by the IMS node 110, for handling the setup of the session between the first UE 121 and the second UE 122 in the communications network 100. In an example scenario the first UE 121 wants setup a call to the second UE 122. The first UE 121 may be connected to the communications network 100 via the first base station 105 and the second UE 122 may be connected to the communications network 100 via the base station 106.

It should be noted that the embodiments described herein is not limited to setting up a call, but may also relate to messaging, video communication or any other kind of communication which requires a session to be setup between e.g. SIP entities.

The method comprises the following actions, which actions may be taken in any suitable order.

Action 301. When a first user of the first UE 121 tries to call a second user of the second UE 122, a request to setup the call is transmitted to the IMS node 110 located in the IMS network.

The IMS node 110 receives the request to set up the session from the first UE 121 to the second UE 122. The request indicates the privacy value which the first UE 121 has requested to apply for the session. The wording privacy value when used herein may mean a value used to indicate a level of privacy which a UE wants for a session. The indicated privacy value may be included in a header, e.g. in the form of a parameter or information element. The privacy value may indicate level of privacy or function of privacy such as header privacy, session privacy, or non-privacy.

In some embodiments the received request may be a SIP Invite message for setting up the session between the first UE 121 and the second UE 122. The indicated privacy value may then be a parameter in a SIP privacy header.

Action 302. Upon receiving the request for setting up the session between the first UE 121 and the second UE 122, the IMS node 110 may note the comprised privacy value in the request. The IMS node 110 sends the request to the server node 130. The request comprises the identity of the first UE 121 and the privacy value. In some embodiments the request further comprises the identity of the second UE 122.

In order to protect the second UE 122 from malicious calls, such as spam, the IMS node 110 requests the server node 130 to analyse the reputation of the first UE 121 and send back the result to the IMS node 110. This is to be able to later on decide how the call between the first UE 121 and the second UE 122 should be handled.

Thus the request requests the server node 130 to analyse the reputation of the first UE 121 based on the identity of the first UE 121 and the privacy value.

In some of these embodiments the request further requests the server node 130 to analyse the reputation of the first UE 121 based on any one or more out of the identity of the second UE 121, the identity of the first UE 121, and the privacy value. Providing more information to the server node 130, may increases the accuracy of the analysis.

In some of these embodiments, the IMS node 110 may use the OMA RESTful API when sending the request to the server node 130. The identity of the first UE 121, the privacy value, and, in some embodiments, the identiy of the second UE 122, may be comprised as elements in a call notficiation of type calldirection.

In some of these embodiments, the IMS node 110 may check if the second UE 122 is provisioned with a call treatment service, and may further check if the call treatment service is activated, before sending the request to the server node 130.

Action 303. The server node 130 analyses reputation according to the request. The IMS node 110 receives the response from the server node 130. The response indicates the analysed reputation of the first UE 121. The analysed reputation of the first UE 121 may, but is not limited to, be in the form of a value, where the value indicates the reputation of the first UE 121. In some embodiments, the response further comprises a recommendation, based on the analysed reputation of the first UE 121, on how to handle the session setup. Further, the received recommendation may, but is not limited to, indicate to allow the session setup, to reject session setup, to allow session continuation but with an indication of SPAM possibility or that no recommendation can be given.

Action 304. The IMS node 110 decides how to handle the session setup and session privacy, based on the analysed reputation of the first UE 121. By using the analysed reputation of the first UE 121, the IMS node 110 may make a well informed decision on how to handle the session setup and prevent malicious calls such as spam from reaching the second UE 122. In some of these embodiments, the IMS node 110 may decide how to handle the session setup by further handle the session setup based on the received recommendation. The IMS node 110, may however, take the analysed reputation into consideration but then decide how to handle the session setup in contrary to the any one or more out of the received analysed reputation of the first UE 121 and the received recommendention. This is since the IMS node 110, may decide how to handle the session setup based on yet further facts. The IMS node 110 may e.g. know of a preexisting relationship between the first UE 121 and the second UE 122, the identity of the first UE 121 may be listed on a white list of allowed identities belonging to the second UE 122 or the identity of the first UE 121 may be listed on a black list of blocked identities belonging to the second UE 122.

Based on the deciding in action 304, how to handle the session setup and session privacy, the IMS node 110 may act according to anyone out of the below action 305 and action 306.

Action 305. If the IMS node 110 decides that the analysed reputation of the first UE 121 is acceptable, the IMS node 110 may setup the session with privacy value according to the decision. The session between the first UE 121 and the second UE will then in some embodiments be setup, with the process of analysing the reputation of the first UE 121 transparent to both UEs.

Action 306. If, on the other hand, the IMS node 110 decides that the analysed reputation of the first UE 121 is not acceptable, the IMS node 110 may reject the session setup according to the decision. In some embodiments, the IMS node 110 may announce to any one or more out of the first UE 121 and the second UE 122 that the session setup is rejected. This may e.g. be performed by. but not limited to, playing an announcement or sending a message.

Figure 4:
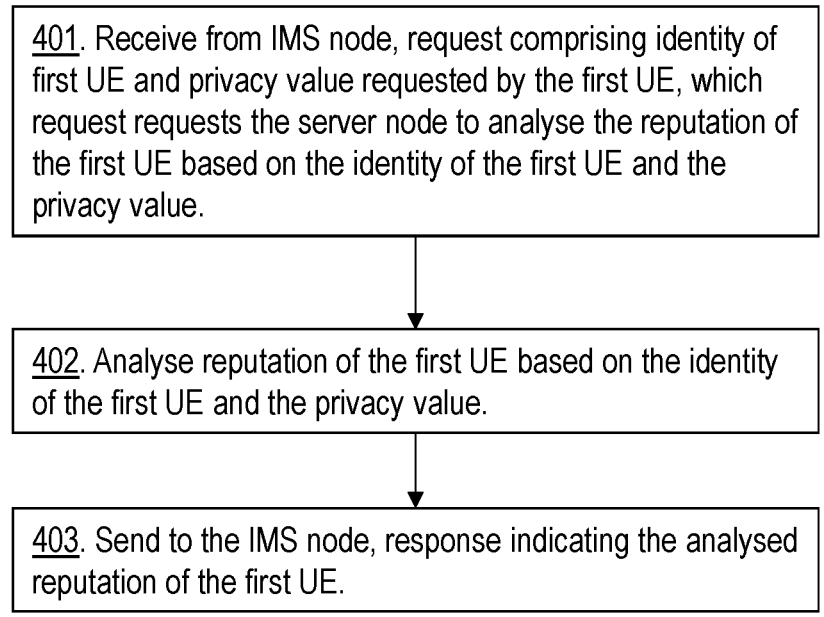
FIG. 4 is a flow chart depicting embodiments of a method in a server node.

FIG. 4 shows example embodiments of a method performed by the server node 130, for handling the setup of the session between the first UE 121 and the second UE 122 in the communications network 100. In an example scenario the first UE 121 wants to setup a call to the second UE 122. The first UE 121 may be connected to the communications network 100 via the first base station 105 and the second UE may be connected to the communications network 100 via the base station 106.

The method comprises the following actions, which actions may be taken in any suitable order.

Action 401. During a session setup process, the IMS node 110 may want to protect the second UE 122 from malicious calls such as spam. To achieve this, the reputation of the first UE 121 trying to call the second UE 122, will be analysed by the server node 130.

The server node 130 receives the request from the IMS node 110. The request comprises the identity of the first UE 121 and the privacy value requested by the first UE 121. The indicated privacy value may be included in a header, e.g. in the form of a parameter or information element.

The request requests the server node 130 to analyse the reputation of the first UE 121 based on the identity of the first UE 121 and the privacy value.

In some embodiments, the request may further comprise the identity of the second UE 122.

In some of these embodiments, the request further requests the server node 130 to analyse the reputation of the first UE 121 based on any one or more out of: the identity of the second UE 121, the identity of the first UE 121, and the privacy value. When the server node 130 has more facts to base its analysis on such as the the identity of the second UE 122, the identity of the first UE 121, and the privacy value according to embodiments herein, the accuracy of the analysis result will be increased, as will the possibility of identifying malicious callers. Further, machine learning algorithms applied by the server node 130 will be improved whilst complying with security wishes of UEs.

In some of these embodiments, the IMS node 110 may use the OMA RESTful API when sending the request to the server node 130. The identity of the first UE 121, the privacy value, and, in some embodiments, the identiy of the second UE 122, may be comprised as elements in a call notficiation of type calldirection.

Action 402. Following the request, the server node 130 analyses the reputation of the first UE 121 based on the identity of the first UE 121 and the privacy value. In some embodiments, when the server node 130 analyses the reputation of the first UE 121 the server node 130 may further determine a recommendation on how to handle the session setup based on the analysed reputation of the first UE 121. This recommendation may be used by IMS node 110 when deciding how to handle the session setup.

In some embodiments, the server node 130 analyses the reputation of the first UE 121 based on any one or more out of the identity of the first UE 121, the identity of the second UE 122, and the privacy value. E.g. machine learning models may be used to perform the analysis.

Action 403. The server node 130 sends the response to the IMS node 110. The response indicates to the IMS node 110, the analysed reputation of the first UE 121.

In some embodiments, the response further comprises the recommendation on how to handle the session set up based on the analysed reputation of the first UE 121.

The above embodiments will now be further explained and exemplified below. The embodiments described below may be combined with any of the embodiments described above.

Figure 5A:
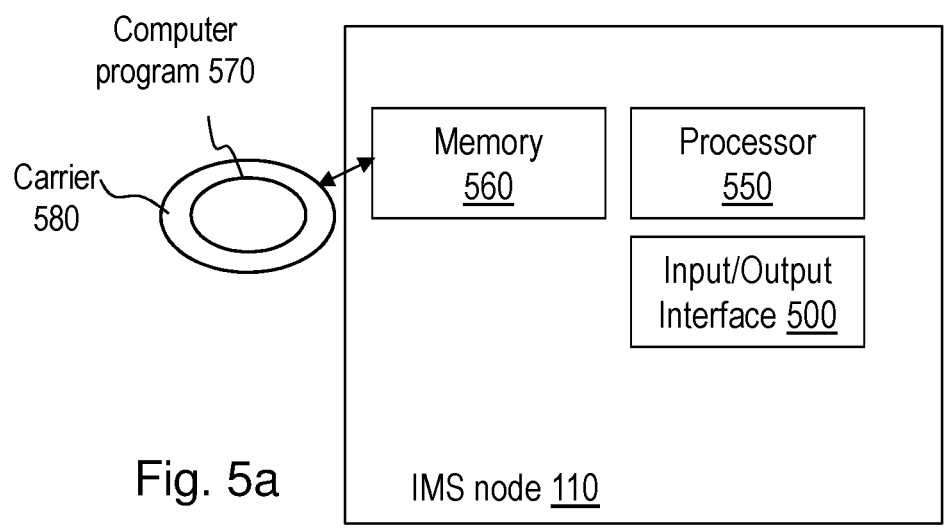
FIG. 5a-b are schematic block diagrams illustrating embodiments of an IMS node.
Figure 5B:
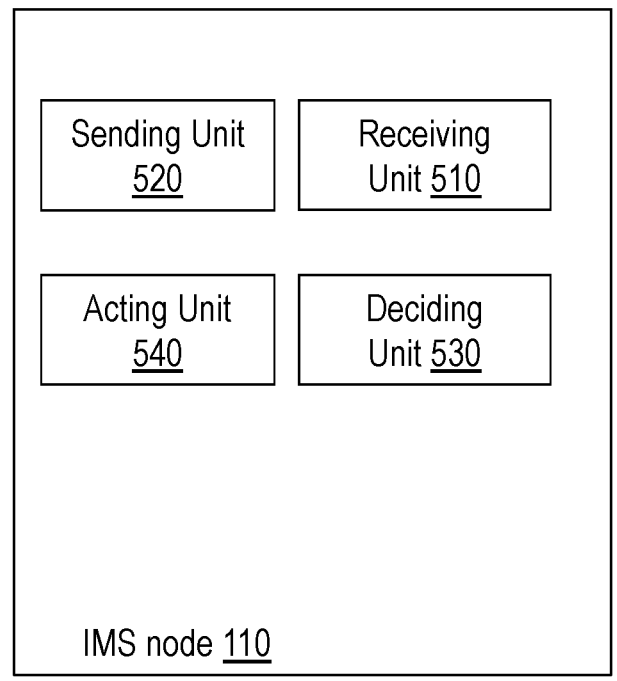

To perform the method actions above, the IMS node 110 is configured to handle the setup of the session between the first UE 121 and the second UE 122 in the communications network 100, the IMS node 110 may comprise an arrangement depicted in FIGS. 5a and 5b.

The IMS node 110 may comprise an input and output interface 500 configured to communicate with network nodes such as the server node 130, other network nodes inside or outside the IMS network (not shown), the first UE 121 and the second UE 122. The input and output interface 500 may comprise a wireless receiver (not shown) and a wireless transmitter (not shown).

The IMS node 110 is further configured to, e.g. by means of a receiving unit 510 in the IMS node 110, receive the request to setup the session from the first UE 121 to the second UE 122. The request is adapted to indicate the privacy value which the first UE 121 has requested to apply for the session.

The IMS node 110 is further configured to, e.g. by means of the receiving unit 510 in the IMS node 110, receive the response from the server node 130, which response is adapted to indicate the analysed reputation of the first UE 121. In some embodiments, the response may further be adapted to comprise the recommendation, based on the analysed reputation of the first UE 121, on how to handle the session setup.

The IMS node 110 is further configured to, e.g. by means of a sending unit 520 in the IMS node 110, send the request to the server node 130, which request is adapted to comprise the identity of the first UE 121 and the privacy value. The request is adapted to request the server node 130 to analyse the reputation of the first UE 121 based on the identity of the first UE 121 and the privacy value.

The request may further be adapted to comprise the identity of the second UE 122 and the request may further be adapted to request the server node 130 to analyse the reputation of the first UE 121 based on any one or more out of: the identity of the second UE 122, the identity of the first UE 121, and the privacy value.

The IMS node 110 is further configured to, e.g. by means of a deciding unit 530 in the IMS node 110, decide how to handle the session setup and session privacy, based on the analysed reputation of the first UE 121.

The IMS node 110 may further be configured to decide how to handle the session setup by further handle the session setup based on the received recommendation.

The IMS node 110 may further be configured to decide how to handle the session setup by further ignoring the any one or more out of the received analysed reputation of the first UE 121 and the received recommendention.

The IMS node 110 may further be configured to, based on the decision on how to handle the session setup and session privacy, e.g. by means of an acting unit 540 in the IMS node 110, act according to anyone out of: setup the session with privacy value according to the decision, or reject the session setup according to the decision. The IMS node 110 may further be configured to reject the session setup by announcing to any one or more out of the first UE 121 and the second UE 122 that the session setup is rejected.

The embodiments herein may be implemented through a respective processor or one or more processors, such as the processor 550 of a processing circuitry in the IMS node 110 depicted in FIG. 5a, together with respective computer program code for performing the functions and actions of the embodiments herein. The program code mentioned above may also be provided as a computer program product, for instance in the form of a data carrier carrying computer program code for performing the embodiments herein when being loaded into the IMS node 110. One such carrier may be in the form of a CD ROM disc. It is however feasible with other data carriers such as a memory stick. The computer program code may furthermore be provided as pure program code on a server and downloaded to the IMS node 110.

The IMS node 110 may further comprise a memory 560 comprising one or more memory units. The memory 560 comprises instructions executable by the processor in IMS node 110. The memory 560 is arranged to be used to store e.g. reputation analysis results, identities, privacy values, information, indications, data, configurations, and applications to perform the methods herein when being executed in the IMS node 110.

In some embodiments, a computer program 570 comprises instructions, which when executed by the respective at least one processor 550, cause the at least one processor of the IMS node 110 to perform the actions above.

In some embodiments, a respective carrier 580 comprises the respective computer program 570, wherein the carrier 580 is one of an electronic signal, an optical signal, an electromagnetic signal, a magnetic signal, an electric signal, a radio signal, a microwave signal, or a computer-readable storage medium.

Those skilled in the art will appreciate that the units in the IMS node 110 described above may refer to a combination of analog and digital circuits, and/or one or more processors configured with software and/or firmware, e.g. stored in the IMS node 110, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 6A:
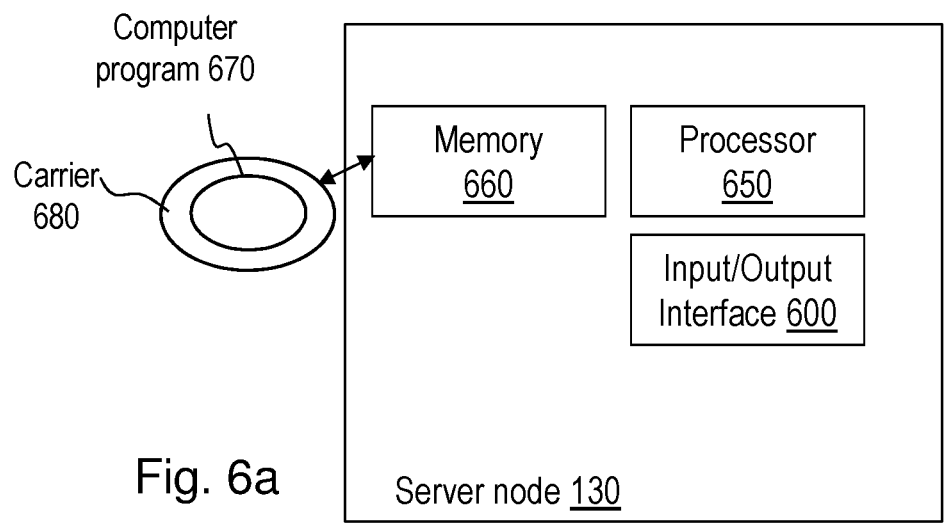
FIG. 6a-b are schematic block diagrams illustrating embodiments of a server node.
Figure 6B:
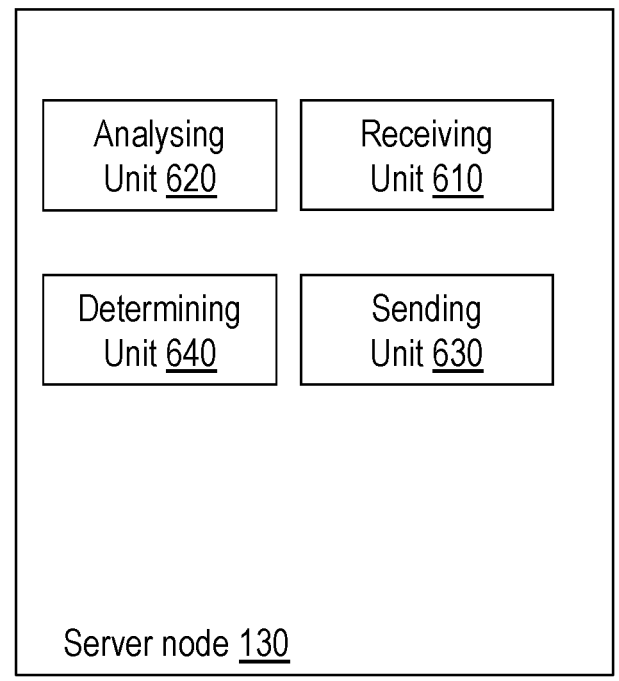

To perform the method actions above, the server node 130 is configured to handle a setup of a session between a first User Equipment, UE, 121 and a second UE 122 in a communications network 100, the server node 130 may comprise an arrangement depicted in FIGS. 6a and 6b.

The server node 130 may comprise an input and output interface 600 configured to communicate with network nodes such as the IMS node 110. The input and output interface 600 may comprise a wireless receiver (not shown) and a wireless transmitter (not shown).

The server node 130 is further configured to, e.g. by means of a receiving unit 610 in the server node 130, receive the request from the IMS node 110. The request is adapted to comprise the identity of the first UE 121 and the privacy value requested by the first UE 121. The request is further adapted to request the server node 130 to analyse the reputation of the first UE 121 based on the identity of the first UE 121 and the privacy value. The request may further be adapted to comprise the identity of the second UE 122 and the request may further be adapted to request the server node 130 to analyse the reputation of the first UE 121 based on any one or more out of: the identity of the second UE 121, the identity of the first UE 121, and the privacy value.

The server node 130 is further configured to, e.g. by means of an analysing unit 620 in the server node 130, analyse the reputation of the first UE 121 based on the identity of the first UE 121 and the privacy value. The server node 130 may further be configured to analyse the reputation of the first UE 121 based on any one or more out of the identity of the first UE 121, the identity of the second UE 122, and the privacy value.

The server node 130 may further be configured to analyse the reputation of the first UE 121 by further, e.g. by means of a determining unit 640 in the server node 130, determine, based on the analysed reputation of the first UE 121, the recommendation on how to handle the session setup.

The server node 130 is further configured to, e.g. by means of a sending unit 630 in the server node 130, send the response to the IMS node 110, which response is adapted to indicate to the IMS node 110, the analysed reputation of the first UE 121.

The response may further be adapted to comprise the recommendation on how to handle the session setup based on the analysed reputation of the first UE 121.

The embodiments herein may be implemented through a respective processor or one or more processors, such as the processor 650 of a processing circuitry in the server node 130 depicted in FIG. 6a, together with respective computer program code for performing the functions and actions of the embodiments herein. The program code mentioned above may also be provided as a computer program product, for instance in the form of a data carrier carrying computer program code for performing the embodiments herein when being loaded into the server node 130. One such carrier may be in the form of a CD ROM disc. It is however feasible with other data carriers such as a memory stick. The computer program code may furthermore be provided as pure program code on a server and downloaded to the server node 130.

The server node 130 may further comprise a memory 660 comprising one or more memory units. The memory 660 comprises instructions executable by the processor in the server node 130. The memory 660 is arranged to be used to store e.g. reputation analysis results, identities, privacy values, information, indications, data, configurations, and applications to perform the methods herein when being executed in the server node 130.

In some embodiments, a computer program 670 comprises instructions, which when executed by the respective at least one processor 650, cause the at least one processor of the server node 130 to perform the actions above.

In some embodiments, a respective carrier 680 comprises the respective computer program 670, wherein the carrier 680 is one of an electronic signal, an optical signal, an electromagnetic signal, a magnetic signal, an electric signal, a radio signal, a microwave signal, or a computer-readable storage medium.

Those skilled in the art will appreciate that the units in the server node 130 described above may refer to a combination of analog and digital circuits, and/or one or more processors configured with software and/or firmware, e.g. stored in the server node 130, that when executed by the respective one or more processors such as the processors described above. One or more of these processors, as well as the other digital hardware, may be included in a single Application-Specific Integrated Circuitry (ASIC), or several processors and various digital hardware may be distributed among several separate components, whether individually packaged or assembled into a system-on-a-chip (SoC).

Figure 7:
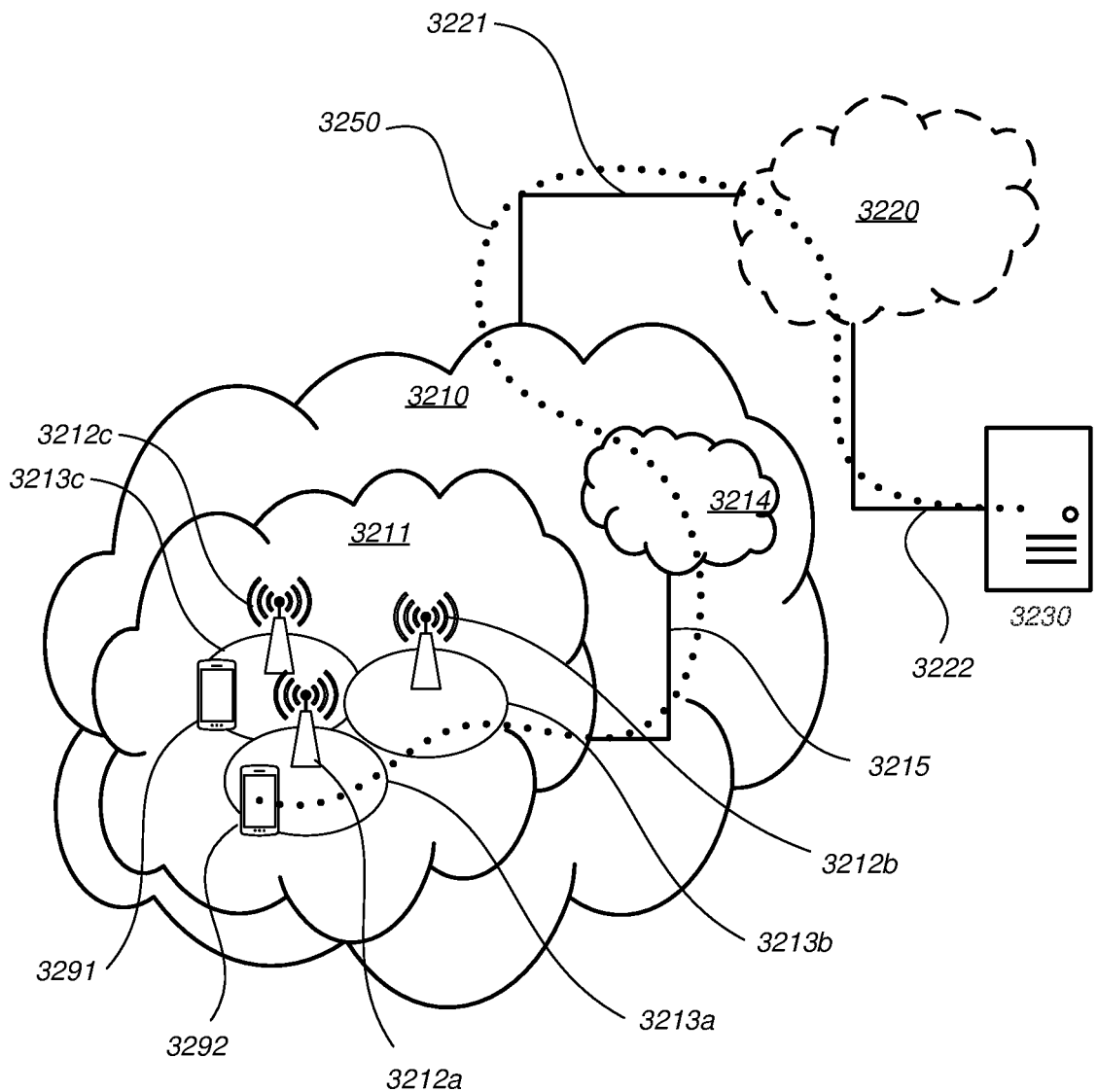
FIG. 7 schematically illustrates a telecommunication network connected via an intermediate network to a host computer.

With reference to FIG. 7, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212a, 3212b, 3212c, such as AP STAs NBs, eNBs, gNBs or other types of wireless access points, each defining a corresponding coverage area 3213a, 3213b, 3213c. Each base station 3212a, 3212b, 3212c is connectable to the core network 3214 over a wired or wireless connection 3215. A first user equipment (UE) such as a Non-AP STA 3291 located in coverage area 3213c is configured to wirelessly connect to, or be paged by, the corresponding base station 3212c. A second UE 3292 such as a Non-AP STA in coverage area 3213a is wirelessly connectable to the corresponding base station 3212a. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 7 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signaling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 8. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 8) served by the base station 3320. The communication interface 3326 may be configured to facilitate a connection 3360 to the host computer 3310. The connection 3360 may be direct or it may pass through a core network (not shown in FIG. 8) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 8:
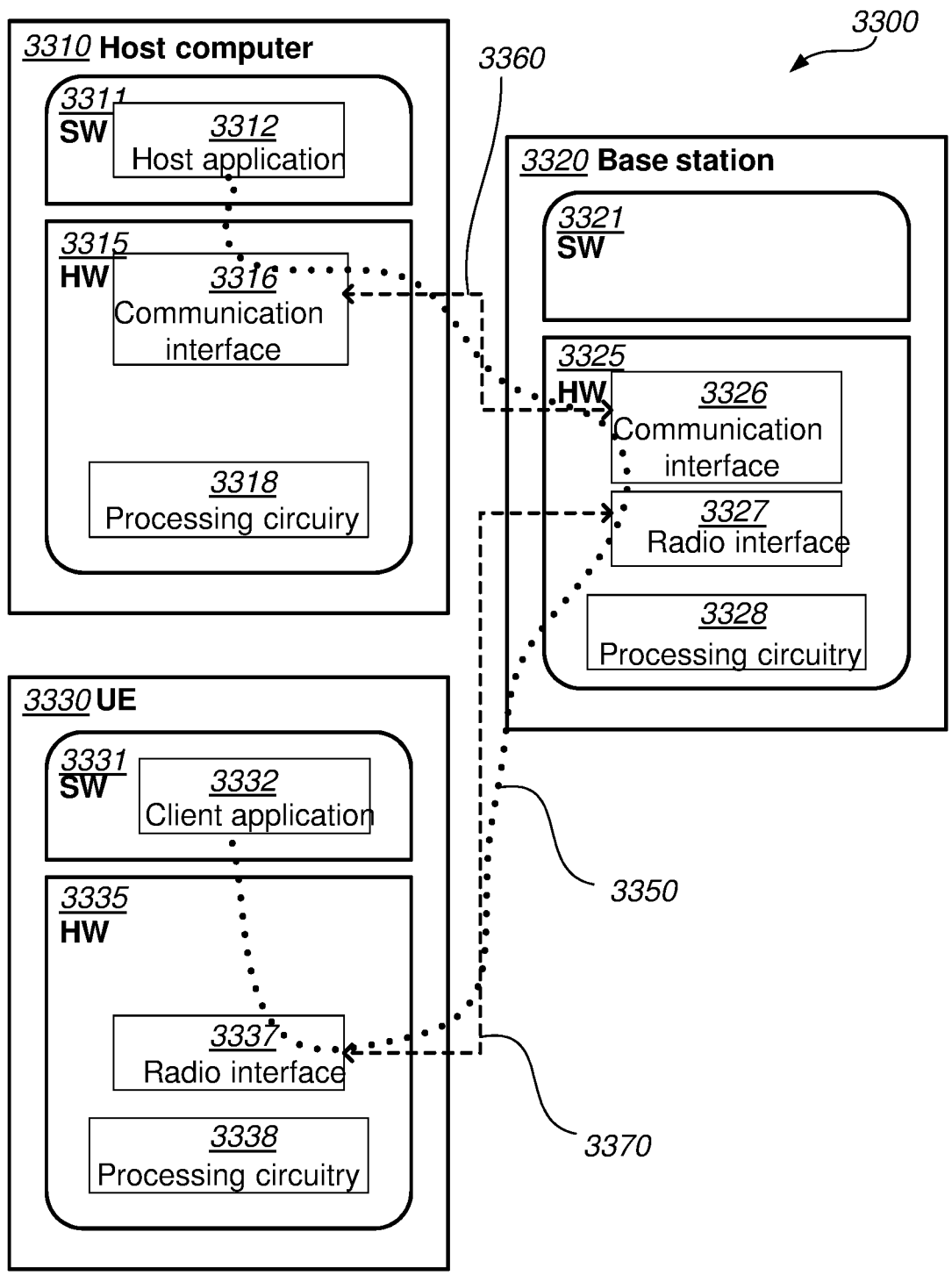
FIG. 8 is a generalized block diagram of a host computer communicating via a base station with a user equipment over a partially wireless connection.

It is noted that the host computer 3310, base station 3320 and UE 3330 illustrated in FIG. 8 may be identical to the host computer 3230, one of the base stations 3212*a*, 3212*b*, 3212*c* and one of the UEs 3291, 3292 of FIG. 7, respectively. This is to say, the inner workings of these entities may be as shown in FIG. 8 and independently, the surrounding network topology may be that of FIG. 7.

In FIG. 8, the OTT connection 3350 has been drawn abstractly to illustrate the communication between the host computer 3310 and the use equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the communication since spam is reduced and thereby provide benefits such as extended battery lifetime.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signaling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figures 9, 10:
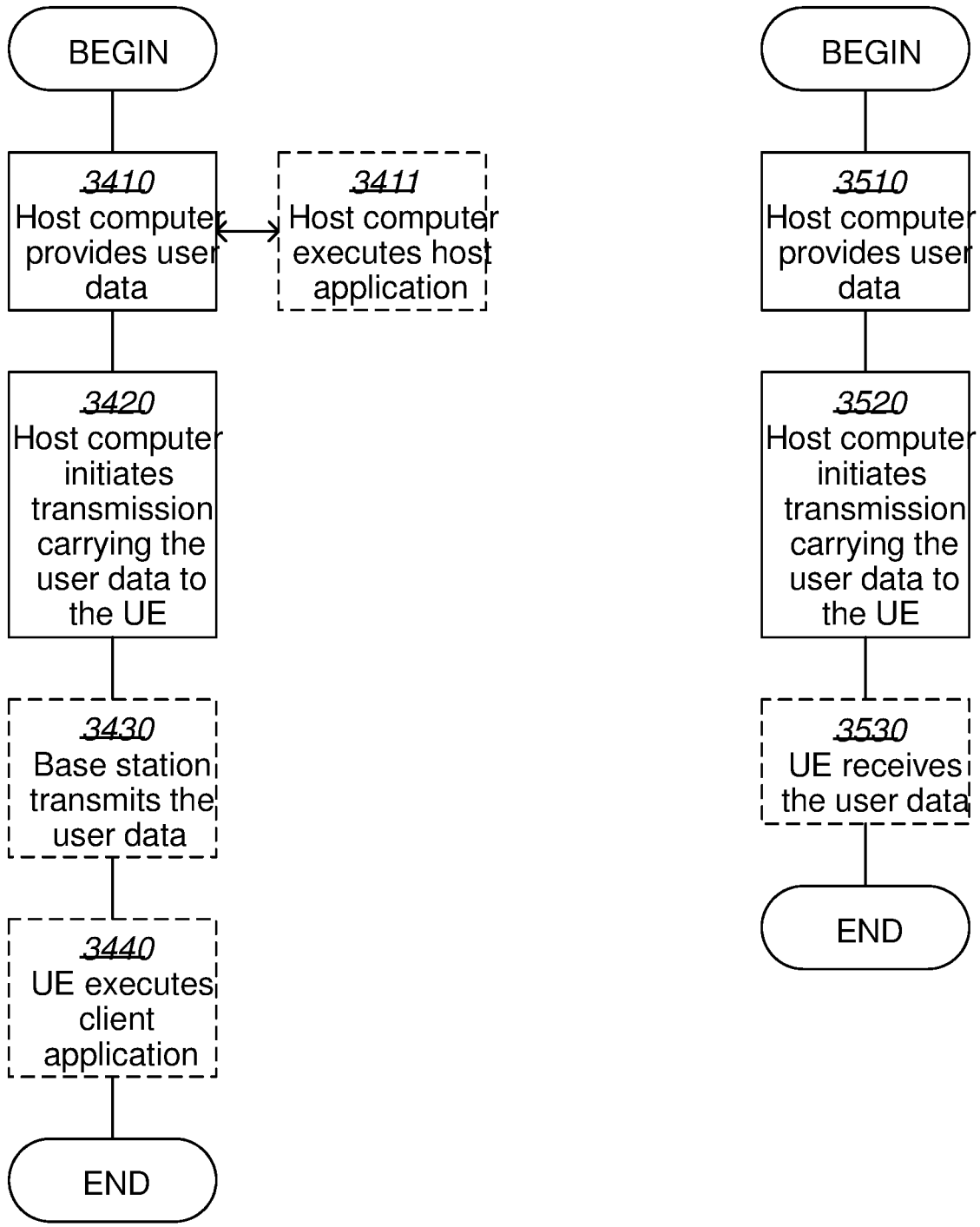

FIG. 9 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 9 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

FIG. 10 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 10 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

FIG. 11 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 11 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

FIG. 12 is a flowchart illustrating a method implemented in a communication system, in accordance with one embodiment. The communication system includes a host computer, a base station such as a AP STA, and a UE such as a Non-AP STA which may be those described with reference to FIG. 7 and FIG. 8. For simplicity of the present disclosure, only drawing references to FIG. 12 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

When using the word "comprise" or "comprising" it shall be interpreted as non-limiting, i.e. meaning "consist at least of".

The embodiments herein are not limited to the above described preferred embodiments. Various alternatives, modifications and equivalents may be used.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by an Internet Protocol Multimedia Subsystem, IMS, node, for handling a setup of a session between a first User Equipment, UE, and a second UE, in a communications network, the method comprising:
    receiving a request to setup a session from the first UE to the second UE, wherein the request indicates a privacy value which the first UE has requested to apply for the session, wherein the privacy value indicates a level of privacy or a function of privacy comprising one or more of header privacy, session privacy, or non-privacy,
    sending a request to a server node, which request comprises an identity of the first UE and the privacy value, and which request requests the server node to analyze a reputation of the first UE based on the identity of the first UE and the privacy value,
    receiving a response from the server node, which response indicates the analyzed reputation of the first UE, and
    deciding how to handle the session setup and session privacy, based on the analyzed reputation of the first UE.

2. The method according to claim 1, further comprising, based on the deciding how to handle the session setup and session privacy, acting according to any one out of:
    setting up the session with privacy value according to the decision, or
    rejecting the session setup according to the decision.

3. The method according to claim 2, wherein the rejecting of the session setup further comprises announcing to any one or more out of the first UE and the second UE that the session setup is rejected.

4. The method according to claim 1, wherein the response further comprises a recommendation, based on the analyzed reputation of the first UE, on how to handle the session setup, and wherein deciding how to handle the session setup further comprises handling the session setup based on the received recommendation.

5. The method according to claim 1, wherein:
    the request further comprises an identity of the second UE,
    the request further requests the server node to analyze the reputation of the first UE based on any one or more out of: the identity of the second UE, the identity of the first UE, and the privacy value.

6. A computer program comprising instructions, which when executed by a processor, causes the processor to perform actions according to claim 1.

7. A non-transitory carrier comprising the computer program of claim 6, wherein the carrier comprises a non-transitory computer-readable storage medium.

8. A method performed by a server node, for handling a setup of a session between a first User Equipment, UE, and a second UE in a communications network, the method comprising:
    receiving a request from an Internet Protocol Multimedia Subsystem, IMS, node, which request comprises an identity of the first UE and a privacy value requested by the first UE, which request requests the server node to analyze a reputation of the first UE based on the identity of the first UE and the privacy value, wherein the privacy value indicates a level of privacy or a function of privacy comprising one or more of header privacy, session privacy, or non-privacy;
    analyzing the reputation of the first UE based on the identity of the first UE and the privacy value; and sending a response to the IMS node, which response indicates to the IMS node, the analyzed reputation of the first UE.

9. The method according to claim 8, wherein:
the request further comprises an identity of the second UE,
the request further requests the server node to analyze the reputation of the first UE based on any one or more out of: the identity of the second UE, the identity of the first UE, and the privacy value.

10. The method according to claim 8, wherein the analyzing of the reputation of the first UE further comprises determining, based on the analyzed reputation of the first UE, a recommendation on how to handle the session setup.

11. The method according to claim 10, wherein the response further comprises the recommendation on how to handle the session setup based on the analyzed reputation of the first UE.

12. A computer program comprising instructions, which when executed by a processor, causes the processor to perform actions according to claim 8.

13. A carrier comprising the computer program of claim 12, wherein the carrier comprises a non-transitory computer-readable storage medium.

14. An Internet Protocol Multimedia Subsystem, IMS, node, configured to handle a setup of a session between a first User Equipment, UE, and a second UE in a communications network, the IMS node being further configured to:
receive a request to setup a session from the first UE to the second UE, wherein the request is adapted to indicate a privacy value which the first UE has requested to apply for the session, wherein the privacy value indicates a level of privacy or a function of privacy comprising one or more of header privacy, session privacy, or non-privacy,
send a request to a server node, which request is adapted to comprise an identity of the first UE and the privacy value, and which request is adapted to request the server node to analyze a reputation of the first UE based on the identity of the first UE and the privacy value,
receive a response from the server node, which response is adapted to indicate the analyzed reputation of the first UE, and
decide how to handle the session setup and session privacy, based on the analyzed reputation of the first UE.

15. The IMS node according to claim 14, further being configured to, based on the decision on how to handle the session setup and session privacy, act according to anyone out of:
setup the session with privacy value according to the decision, or
reject the session setup according to the decision.

16. The IMS node according to claim 15, further being configured to reject the session setup by further announce to any one or more out of the first UE and the second UE that the session setup is rejected.

17. The IMS node according to claim 14, wherein the response further is adapted to comprise a recommendation, based on the analyzed reputation of the first UE, on how to handle the session setup, and wherein the IMS node further is configured to decide how to handle the session setup by further handle the session setup based on the received recommendation.

18. The IMS node according to claim 14, wherein:
the request further is adapted to comprise an identity of the second UE,
the request further is adapted to request the server node to analyze the reputation of the first UE based on any one or more out of: the identity of the second UE, the identity of the first UE, and the privacy value.

19. A server node configured to handle a setup of a session between a first User Equipment, UE, and a second UE in a communications network, the server node further being configured to:
receive a request from an Internet Protocol Multimedia Subsystem, IMS, node, which request is adapted to comprise an identity of the first UE and a privacy value requested by the first UE, which request is adapted to request the server node to analyze a reputation of the first UE based on the identity of the first UE and the privacy value, wherein the privacy value indicates a level of privacy or a function of privacy comprising one or more of header privacy, session privacy, or non-privacy;
analyze the reputation of the first UE based on the identity of the first UE and the privacy value; and
send a response to the IMS node, which response is adapted to indicate to the IMS node, the analyzed reputation of the first UE.

20. The server node according to claim 19, wherein:
the request further is adapted to comprise an identity of the second UE,
the request further is adapted to request the server node to analyze the reputation of the first UE based on any one or more out of: the identity of the second UE, the identity of the first UE, and the privacy value.

21. The server node according to claim 19, further being configured to analyze of the reputation of the first UE by further determine, based on the analyzed reputation of the first UE, a recommendation on how to handle the session setup.

22. The server node according to claim 21, wherein the response further is adapted to comprise the recommendation on how to handle the session setup based on the analyzed reputation of the first UE.

* * * * *